US011770822B2

(12) United States Patent
Ye (10) Patent No.: US 11,770,822 B2
(45) Date of Patent: Sep. 26, 2023

(54) METHOD AND APPARATUS FOR MANAGING SCHEDULING REQUESTS IN AN UNLICENSED FREQUENCY BAND

(71) Applicant: Google LLC, Mountain View, CA (US)

(72) Inventor: Shiang-Rung Ye, New Taipei (TW)

(73) Assignee: Google LLC, Mountain View, CA (US)

(*) Notice: Subject to any disclaimer, the term of this patent is extended or adjusted under 35 U.S.C. 154(b) by 290 days.

(21) Appl. No.: 16/973,375

(22) PCT Filed: Jul. 30, 2019

(86) PCT No.: PCT/US2019/044202
§ 371 (c)(1),
(2) Date: Dec. 8, 2020

(87) PCT Pub. No.: WO2020/028404
PCT Pub. Date: Feb. 6, 2020

(65) Prior Publication Data
US 2021/0250967 A1 Aug. 12, 2021

Related U.S. Application Data (60) Provisional application No. 62/713,867, filed on Aug. 2, 2018.

(51) Int. Cl.
H04W 72/1268 (2023.01)
H04W 16/14 (2009.01)
(Continued)

(52) U.S. Cl.
CPC ....... *H04W 72/1268* (2013.01); *H04W 16/14* (2013.01); *H04W 72/0453* (2013.01); *H04W 72/569* (2023.01)

(58) Field of Classification Search
None
See application file for complete search history.

(56) References Cited

U.S. PATENT DOCUMENTS 8,582,514 B2 11/2013 Moberg et al.
9,769,805 B2 9/2017 Bergstrom et al.
(Continued)

FOREIGN PATENT DOCUMENTS

GB 2542172 3/2017
WO 2020028404 2/2020

OTHER PUBLICATIONS

"Foreign Office Action", EP Application No. 19755465.2, dated Apr. 22, 2022, 7 pages.
(Continued)

*Primary Examiner* — Srinivasa R Reddivalam
(74) *Attorney, Agent, or Firm* — Colby Nipper PLLC (57) ABSTRACT

This document describes techniques and apparatuses for managing scheduling requests in an unlicensed frequency band. These techniques include a user equipment receiving first and second configuration messages allocating radio resources for first and second logical channels, respectively, at a scheduling request (SR)-transmission occasion on first and second multiple-access (MA) channels, respectively, in the unlicensed frequency band (402, 404). In aspects, the user equipment detects that the first MA channel is busy and the second MA channel is idle (406). The user equipment transmits a scheduling request via the second radio resource (408) and initiates a timer for the second logical channel to prohibit transmission of an additional scheduling request via the second radio resource until expiration of the timer (410). The user equipment also determines whether to initiate another timer for the first logical channel based on a priority level of the first logical channel (414).

20 Claims, 5 Drawing Sheets (51) Int. Cl.
*H04W 72/0453* (2023.01)
*H04W 72/566* (2023.01)

(56) References Cited

U.S. PATENT DOCUMENTS

| | | | |
|---|---|---|---|
| 2015/0078231 A1 | 3/2015 | Bergstrom et al. | |
| 2016/0066195 A1 | 3/2016 | Moon et al. | |
| 2017/0048879 A1 | 2/2017 | Zhang et al. | |
| 2017/0118766 A1 | 4/2017 | Baek et al. | |
| 2017/0142749 A1 | 5/2017 | Kim et al. | |
| 2017/0311317 A1* | 10/2017 | Dinan | H04W 72/0486 |
| 2018/0124831 A1 | 5/2018 | Dinan | |
| 2018/0242357 A1* | 8/2018 | Khirallah | H04W 74/004 |
| 2018/0324635 A1 | 11/2018 | Babaei et al. | |
| 2018/0368156 A1* | 12/2018 | Agiwal | H04W 72/1242 |
| 2020/0037345 A1* | 1/2020 | Ryoo | H04W 72/1284 |
| 2020/0163122 A1* | 5/2020 | Lee | H04W 72/1268 |

OTHER PUBLICATIONS

"International Preliminary Report on Patentability", Application No. PCT/US2019/044202, dated Feb. 2, 2021, 9 pages.
"Foreign Office Action", IN Application No. 202147001318, dated Jan. 6, 2022, 8 pages.
"Discussion on SR Transmission for NR-U", 3GPP TSG-RAN WG2 #103, Gothenburg, Sweden, Aug. 20-24, 2018, Aug. 2018, 2 pages.
"International Search Report and Written Opinion", PCT Application No. PCT/US2019/044202, dated Oct. 28, 2019, 15 pages.
"Written Opinion", PCT Application No. PCT/US2019/044202, dated Nov. 9, 2020, 8 pages.

* cited by examiner

METHOD AND APPARATUS FOR MANAGING SCHEDULING REQUESTS IN AN UNLICENSED FREQUENCY BAND

BACKGROUND

Generally, a provider of a wireless network manages wireless communications over the wireless network. For example, a base station manages a wireless connection with a user device that is connected to the wireless network. The base station determines configurations for the wireless connection, such as bandwidth, timing, and protocol for the wireless connection. Inefficiencies arise, however, when conventional systems that are configured to operate within a licensed frequency band attempt to operate within an unlicensed frequency band. Fifth Generation New Radio (5G NR), for example, utilizes certain transmission rules, such as Clear Channel Assessment (CCA) and Listen-Before-Talk (LBT), to allow different systems, such as Wi-Fi and LTE systems, to share an unlicensed frequency band with a contention-oriented access while maintaining the performance of each individual system. Since the amount of available licensed spectrum is limited and monetarily costly, offloading of cellular traffic through other forms of network, such as the unlicensed spectrum, has been a useful solution. Delays caused by these transmission rules, however, may be unnecessary in some instances, resulting in inefficiencies in the overall system.

SUMMARY

This document describes techniques and apparatuses for managing scheduling requests in an unlicensed frequency band. These techniques include a user equipment receiving a first configuration message allocating a first radio resource for a first logical channel on a first multiple-access (MA) channel in the unlicensed frequency band. The user equipment also receives a second configuration message allocating a second radio resource for a second logical channel on a second MA channel in the unlicensed frequency band. Then, at a scheduling request (SR)-transmission occasion, the user equipment detects that the first MA channel is busy and the second MA channel is idle. Because the second MA channel is idle, the user equipment transmits a scheduling request via the second radio resource and initiates a timer for the second logical channel to prohibit transmission of an additional scheduling request via the second radio resource until expiration of the timer.

The user equipment also determines whether to initiate another timer for the first logical channel based on a priority level of the first logical channel. For example, the user equipment ascertains a priority level of the first logical channel. If the first logical channel has a low priority level, then the user equipment initiates the timer for the first logical channel. If, however, the first logical channel has a high priority level, then the user equipment does not apply the timer, but is allowed to attempt to transmit another scheduling request for the first logical channel via the first radio resource at a next SR-transmission occasion. These techniques reduce delay of data transmission for certain data based on a priority level in comparison to conventional techniques that automatically initiate timers for both logical channels when a scheduling request is transmitted for a radio resource on only one physical channel.

There is provided a method for managing scheduling requests (SR) by a user equipment over an unlicensed frequency band, the method comprising: receiving, by the user equipment, a first configuration message allocating a first radio resource, such as a first physical uplink control channel (PUCCH) resource, for a first logical channel on a first multiple-access (MA) channel in the unlicensed frequency band; receiving, by the user equipment, a second configuration message allocating a second radio resource, such as a second PUCCH resource, for a second logical channel on a second MA channel in the unlicensed frequency band; detecting, at an SR-transmission occasion, that the first MA channel is busy and the second MA channel is idle; and transmitting a first scheduling request via the second radio (such as PUCCH) resource based on the second MA channel being idle. A timer may be initiated for the second logical channel to prohibit transmission of an additional scheduling request via the second logical channel until expiration of the timer. A first priority level for the first logical channel may be ascertained; and based on a high first priority level, transmission of a second scheduling request may be enabled via the first radio (such as PUCCH) resource at a next SR-transmission occasion, for example, by not applying a timer for the first logical channel.

There is also provided a method for managing scheduling requests in an unlicensed frequency band of a wireless network by a base station, the method comprising: receiving, from a user equipment, a plurality of scheduling requests that request to transmit data in the unlicensed frequency band of the wireless network; determining an importance of each scheduling request from the user equipment based on a priority level assigned to a logical channel or logical channel group corresponding to the respective scheduling request; transmitting a first configuration message to the user equipment that allocates a first radio resource for a first logical channel or a first logical channel group, the first radio resource associated with a high priority level based on a first scheduling request of the plurality of scheduling requests; and transmitting a second configuration message to the user equipment that allocates a second radio resource for a second logical channel or a second logical channel group, the second radio resource associated with a low priority level based on a second scheduling request of the plurality of scheduling requests.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of managing scheduling requests in an unlicensed frequency band is described below. The use of the same reference numbers in different instances in the description and the figures indicate similar elements.

DETAILED DESCRIPTION

Conventional wireless communication systems configured for communications within a licensed frequency band may be inefficient within an unlicensed frequency band. Some communications between user equipment devices and serving cell base stations, for example, can be delayed due to certain requirements that may be implemented for communication traffic control over unlicensed frequency bands, such as a listen-before-talk (LBT) rule. According to the LBT rule, to access a wireless communication channel, the user equipment first detects a status of the channel. If the channel is busy, the user equipment is not allowed to transmit a signal on that channel for a certain period of time. If, however, the channel is not busy, the user equipment can transmit a signal on that channel.

A scheduling request (SR) is used for requesting uplink shared channel (UL-SCH) resources for a new transmission. A medium access control (MAC) entity of a user equipment may be configured with zero, one, or more SR configurations. An SR configuration includes a set of radio resources, e.g., Physical Uplink Control Channel (PUCCH) resources, for a scheduling request across different bandwidth parts and cells. For a logical channel, at most one PUCCH resource for a scheduling request is configured per bandwidth part. Each SR configuration corresponds to one or more logical channels. Each logical channel may be mapped to zero or one SR configuration, which is configured by Radio Resource Control (RRC).

With improvements in radio systems such as 5G in an unlicensed frequency band, this LBT restriction may cause unnecessary delays in some instances. For example, in conventional wireless communication systems, when data becomes available for transmission for a logical channel, a regular buffer status report (BSR) for the logical channel is triggered. The BSR is used to provide the base station with information about uplink data volume in the MAC entity of the user equipment. The MAC entity triggers a scheduling request, such as by initiating an SR procedure, when the regular BSR is triggered but an uplink radio resource to transmit the BSR is not available in the user equipment. When no resource is available, the scheduling request is pending. During the SR procedure, the user equipment transmits the scheduling request on the PUCCH if the user equipment is configured with the PUCCH.

For example, the MAC entity instructs a physical layer to transmit the scheduling request at a first SR-transmission occasion, then automatically initiates a timer (e.g., sr-ProhibitTimer) to prevent transmission of another scheduling request within a short time period, such as a time period between SR transmission and an uplink resource allocation. However, if the physical layer is not allowed to transmit the scheduling request at the first SR-transmission occasion (e.g., the unlicensed channel is busy as discovered using LBT), and if the timer is still running, then the MAC entity will not instruct the physical layer to transmit the scheduling request at a next SR-transmission occasion. Instead, the user equipment waits for the timer to expire before transmitting another scheduling request on the physical layer. Several SR-transmission occasions may occur prior to expiration of the timer.

Inefficiencies exist in conventional wireless communication systems when a user equipment has two or more pending scheduling requests. For example, a user equipment may have a first physical uplink control channel (PUCCH) resource for a first logical channel to transmit a scheduling request and a second PUCCH resource for a second logical channel to transmit another scheduling request, both at a first SR-transmission occasion. If both logical channels trigger a scheduling request (e.g., based on data, such as control data, corresponding to each logical channel becoming available for transmission), the user equipment transmits the scheduling request on only one of the PUCCH resources and then typically initiates a first timer for the first logical channel and a second timer for the second logical channel, or a same timer for both logical channels. The user equipment is prevented from transmitting another scheduling request on the PUCCH resources for either logical channel while the corresponding timer is running. Accordingly, although the user equipment transmitted a scheduling request on one of the PUCCH resources, the user equipment cannot transmit a scheduling request on the other PUCCH resource until expiration of the corresponding timer for that PUCCH resource. This delay is unnecessary and inefficient when transmitting data in the unlicensed frequency band.

This document describes techniques and systems for managing scheduling requests in an unlicensed frequency band. If a user equipment transmits a scheduling request on a second PUCCH resource configured for a second logical channel because an unlicensed frequency band used to transmit another scheduling request on a first PUCCH resource of a first logical channel is busy, the user equipment determines whether to initiate a timer for the first logical channel based on a priority level of each of the first and second logical channels. If the first logical channel has a low priority level, then the user equipment initiates the timer for the first logical channel. If, however, the first logical channel has a high priority level, then the user equipment does not initiate the timer, but is allowed to attempt to transmit another scheduling request on the first PUCCH resource at a next SR-transmission occasion. This solution may be applicable to any multiple access channel with LBT rules, including both licensed as well as unlicensed channels. However, for purposes of discussion, this solution is described in relation to unlicensed channels, which are an example of multiple access channels with LBT rules.

This summary is provided to introduce simplified concepts of managing scheduling requests in an unlicensed frequency band. The simplified concepts are further described below in the Detailed Description. This summary is not intended to identify essential features of the claimed subject matter, nor is it intended for use in determining the scope of the claimed subject matter.

Operating Environment

Figure 1:
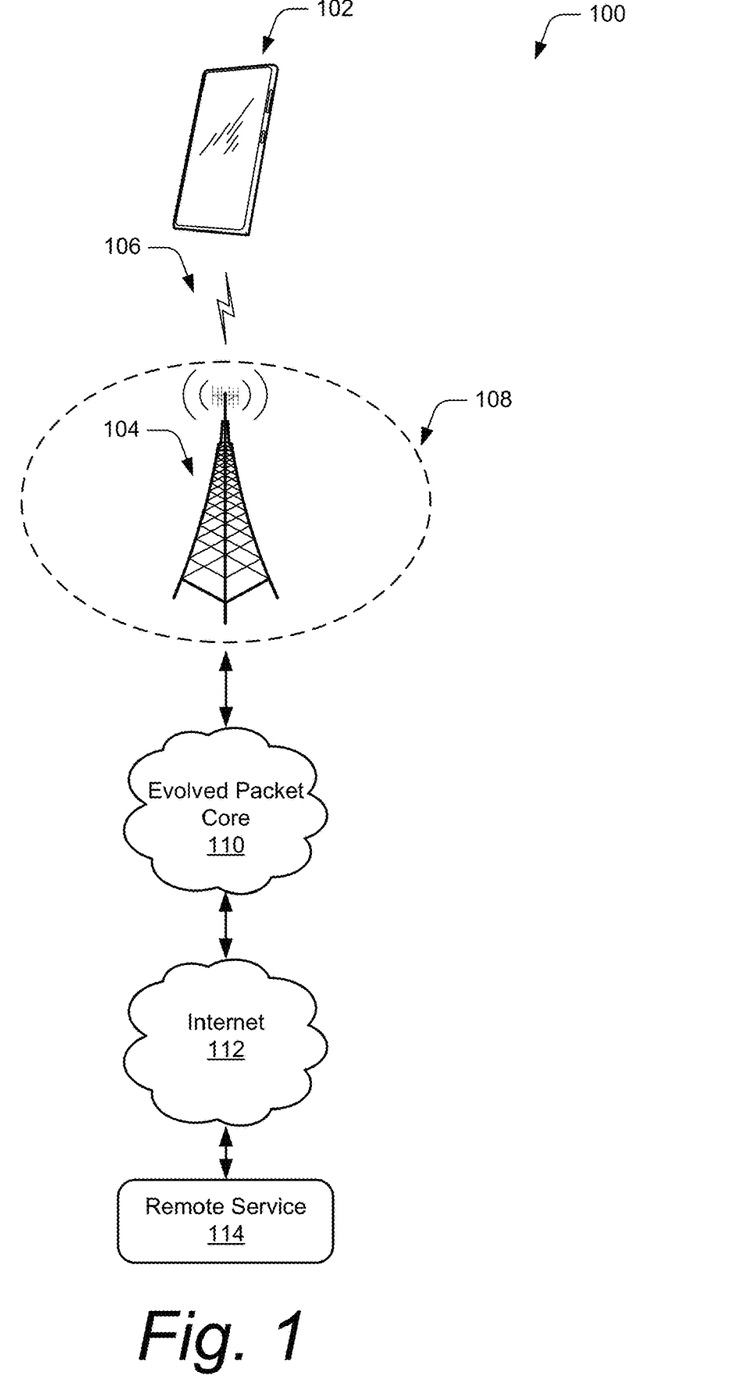
FIG. 1 illustrates an example operating environment in which aspects of managing 5G NR scheduling requests in an unlicensed frequency band can be implemented.

FIG. 1 illustrates an example environment 100, which includes a user equipment 102 that communicates with a base station 104 that acts as a serving cell, (serving cell base station 104), through a wireless communication link 106 (wireless link 106). In this example, the user equipment 102 is implemented as a smartphone. Although illustrated as a smartphone, the user equipment 102 may be implemented as any suitable wireless computing or electronic device, such as a mobile communication device, a modem, cellular phone, gaming device, navigation device, media device, laptop computer, desktop computer, tablet computer, smart appliance, vehicle-based communication system, and the like. The user equipment 102 is configured to operate over a wide range of frequencies, including cellular bands and Industrial, Scientific and Medical Radio (ISM) bands. The base station 104 may be implemented as or include an Evolved Universal Terrestrial Radio Access Network (E-UTRAN), evolved Node B (eNodeB or eNB), a Next Generation Node B (gNodeB or gNB), a long-term evolution (LTE) system, an LTE-Advanced (LTE-A) system, an evolution of the LTE-A system, a 5G NR system, and the like. The base station 104 is configured to operate over a wide range of frequency bands, including ISM and cellular bands. When implemented as part of a wireless network, the base station 104 may be configured to provide or support a macrocell, microcell, small cell, picocell, wide-area network, or any combination thereof. In various aspects of managing scheduling requests in an unlicensed frequency band, the base station 104 may be referred to as an eNB, a gNB, or relay.

The serving cell base station 104 communicates with the user equipment 102 via the wireless link 106, which may be implemented as any suitable type of wireless link. The wireless link 106 can be over any licensed and/or unlicensed frequency band. The wireless link 106 can include a downlink of data and control information communicated from the serving cell base station 104 to the user equipment 102 and/or an uplink of other data and control information communicated from the user equipment 102 to the serving cell base station 104. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth.

The serving cell base station 104 may be part of a Radio Access Network 108 (RAN 108, Evolved Universal Terrestrial Radio Access Network 108, E-UTRAN 108), which is connected via an Evolved Packet Core 110 (EPC 110) network to form a wireless operator network. The user equipment 102 may connect, via a serving cell base station 104 and the EPC 110, to public networks, such as the Internet 112 to interact with a remote service 114.

Figure 2:
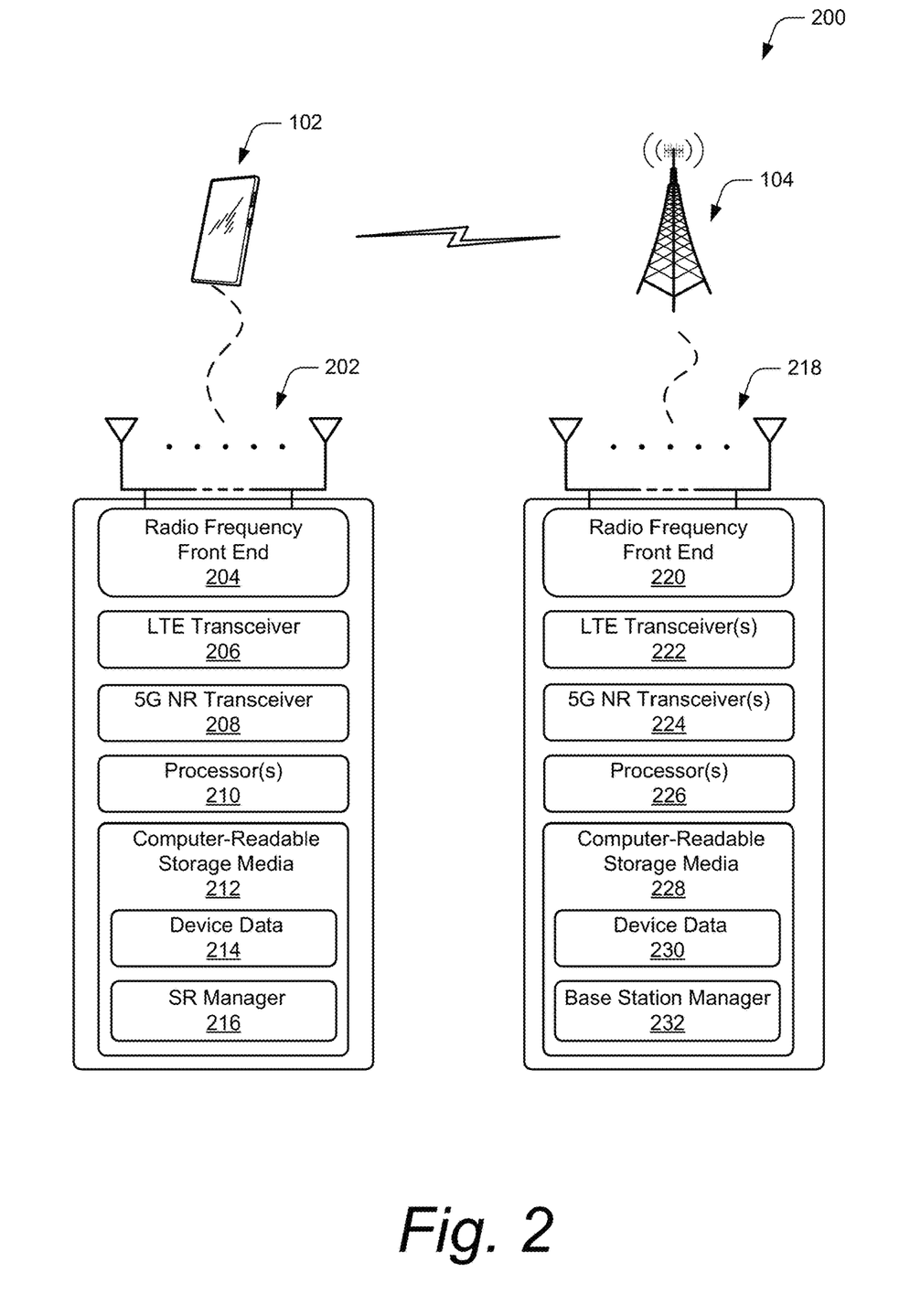
FIG. 2 illustrates an example device diagram of a user equipment and a serving cell base station.

FIG. 2 illustrates an example device diagram 200 of the user equipment 102 and the serving cell base station 104. It should be noted that not all features of the user equipment 102 and the serving cell base station 104 are illustrated here for the sake of clarity. In other words, the user equipment 102 and/or serving base station 104 may also include other suitable components to implement respective communication or processing functions of either device. In this example, the user equipment 102 includes antennas 202, a radio frequency front end 204 (RF front end 204), an LTE transceiver 206, and a 5G NR transceiver 208 for communicating with base stations 104 in the E-UTRAN 108. The RF front end 204 of the user equipment 102 can couple or connect the LTE transceiver 206 and the 5G NR transceiver 208 to the antennas 202 to facilitate various types or modes of wireless communication. The LTE transceiver 206 and the 5G NR transceiver 208 are both examples of a radio frequency transceiver.

The antennas 202 of the user equipment 102 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. Alternatively, the 5G NR transceiver 208 may be replaced with a 5G NR receiver (or transmitter) and operations describe herein as performed by the 5G NR transceiver 208 may performed by the 5G NR receiver (or transmitter).

The user equipment 102 also includes processor(s) 210 and computer-readable storage media 212 (CRM 212). The processor 210 is configured to process communications received via the LTE transceiver 206 and the 5G NR transceiver 208, as well as process data stored in the CRM 212 to generate communications for transmission to the base station 104 by the LTE transceiver 206 and the 5G NR transceiver 208. The processor 210 may be a single core processor or a multiple core processor composed of a variety of materials, such as silicon, polysilicon, high-K dielectric, copper, and so on. The computer-readable storage media described herein excludes propagating signals or carrier waves. The CRM 212 may include any suitable memory or storage device such as subscriber identity module (SIM), random-access memory (RAM), static RAM (SRAM), dynamic RAM (DRAM), non-volatile RAM (NVRAM), read-only memory (ROM), Flash memory, hard disk, or optical data storage device useful to store device data 214 of the user equipment 102. The device data 214 includes user data, multimedia data, applications, and/or an operating system of the user equipment 102, which are executable by processor(s) 210 to enable user interaction with the user equipment 102 or functionalities thereof.

CRM 212 also includes a scheduling request (SR)-manager 216 which, in one implementation, is embodied on CRM 212 (as shown). Alternately or additionally, the SR-manager 216 may be implemented in whole or part as hardware logic or circuitry integrated with or separate from other components of the user equipment 102. In at least some aspects, the SR-manager 216 configures or acts via the RF front end 204, the LTE transceiver 206, and/or the 5G NR transceiver 208 to implement the techniques for managing scheduling requests in an unlicensed frequency band.

The device diagram for the serving cell base station 104 shown in FIG. 2 includes a single network node (e.g., an E-UTRAN Node B or gNodeB). The functionality of the serving cell base station 104 may be distributed across multiple network nodes and/or devices, and can be distributed in any fashion suitable to perform the functions described herein. In this example, the serving cell base station 104 includes antennas 218, a radio frequency front end 220 (RF front end 220), one or more LTE transceivers 222, and/or one or more 5G NR transceivers 224 for communicating with the user equipment 102. The RF front end 220 of the serving cell base station 104 can couple or connect the LTE transceivers 222 and the 5G NR transceivers 224 to the antennas 218 to facilitate various types of wireless communication.

The antennas 218 of the serving cell base station 104 may include an array of multiple antennas that are configured similar to or differently from each other. The antennas 218 and the RF front end 220 can be tuned to, and/or be tunable to, one or more frequency bands defined by the 3GPP LTE and 5G NR communication standards, and implemented by the LTE transceivers 222, and/or the 5G NR transceivers 224. Additionally, the antennas 218, the RF front end 220, the LTE transceivers 222, and/or the 5G NR transceivers 224 may be configured to support beamforming, such as massive multiple input multiple output (mMIMO), for the transmission and reception of communication signals with the user equipment 102.

The serving cell base station 104 also includes processor(s) 226 and computer-readable storage media 228 (CRM 228). The processor 226 may be a single core processor or a multiple core processor composed of a variety of materials, such as silicon, polysilicon, high-K dielectric, copper, and so on. The CRM 228 may include any suitable memory or storage device such as random-access memory (RAM), static RAM (SRAM), dynamic RAM (DRAM), non-volatile RAM (NVRAM), read-only memory (ROM), or Flash memory useful to store device data 230 of the serving cell base station 104. The CRM 228 of the serving cell base station 104 is not configured to store propagating signals or carrier waves. The device data 230 includes network scheduling data, radio resource management data, applications, and/or an operating system of the serving cell base station 104, which are executable by processor(s) 226 to enable communication with the user equipment 102 or functionalities of the serving cell base station 104.

CRM 228 also includes a base station manager 232 which, in one implementation, is embodied in CRM 228 (as shown). Alternately or additionally, the base station manager 232 may be implemented in whole or part as hardware logic or circuitry integrated with or separate from other components of the serving cell base station 104. In at least some aspects, the base station manager 232 configures the LTE transceivers 222 and the 5G NR transceivers 224 for communication with the user equipment 102, as well as communication with the EPC 110.

Figure 3:
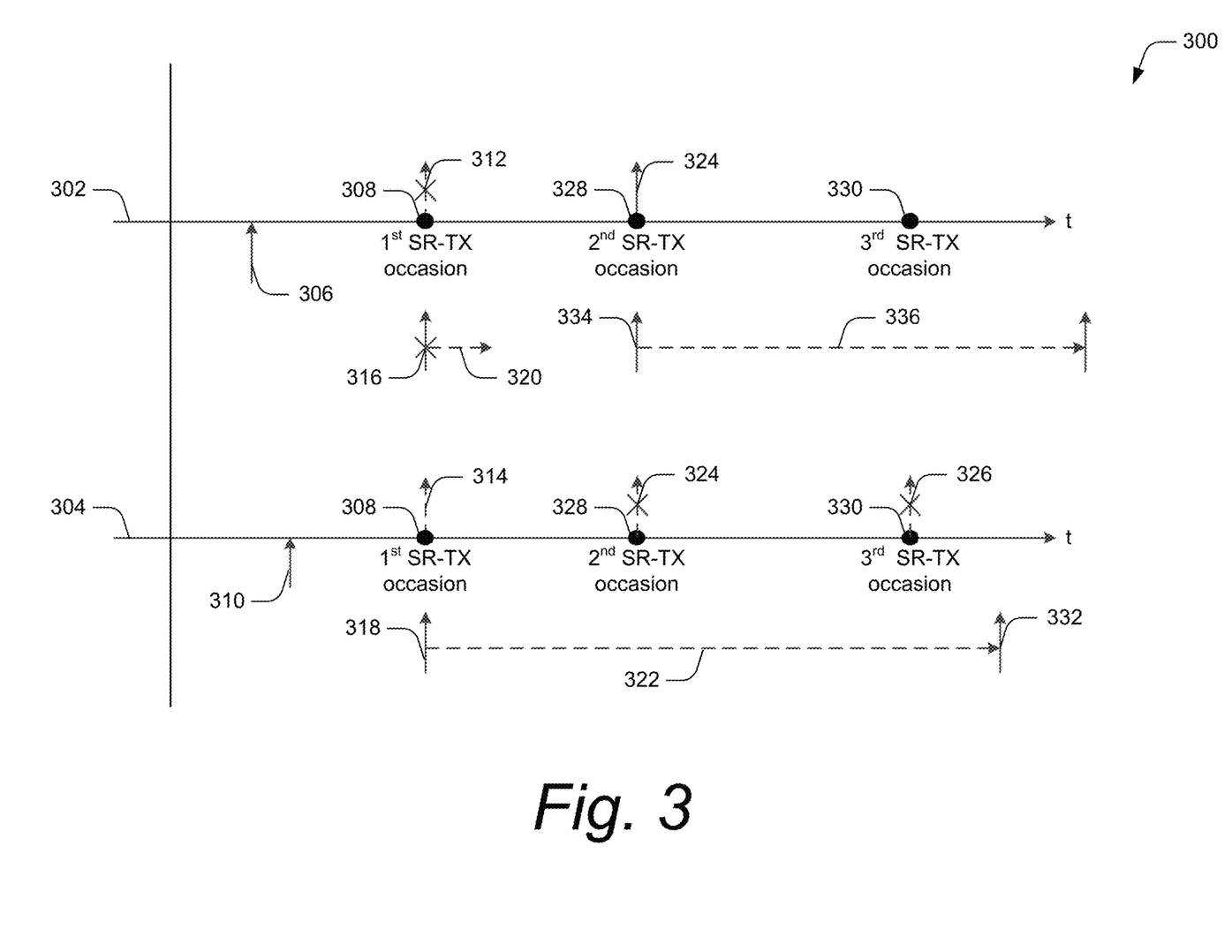
FIG. 3 illustrates an example implementation of a scheduling request procedure in compliance with a listen-before-talk rule.

FIG. 3 illustrates an example implementation 300 of a scheduling request procedure in compliance with an LBT rule. The illustrated implementation 300 includes a first logical channel 302 and a second logical channel 304. In an example, a first scheduling request (SR) is triggered 306 for the first logical channel 302 before a first SR-transmission (SR-TX) occasion 308. The SR1 may be triggered based on the user equipment receiving a configuration message from the base station allocating a PUCCH resource for the first logical channel 302 on a first multiple-access (MA) channel in the unlicensed frequency band. As a result, the first SR-TX occasion 308 is configured by the network to transmit the first scheduling request on the first PUCCH configured for the first logical channel 302. In addition, a second scheduling request (SR2) is triggered 310 for the second logical channel 304 before the first SR-TX occasion 308. The SR2 may be triggered based on the user equipment receiving a second configuration message from the base station allocating a second PUCCH resource for the second logical channel 304 on a second multiple-access (MA) channel in the unlicensed frequency band. Consequently, the first SR-TX occasion 308 is configured by the network to transmit the second scheduling request on a second PUCCH configured for the second logical channel 304. The SR1 and the SR2 may be triggered at different times or at the same time. In this example, both the SR1 and the SR2 are triggered such that they are both pending at the time of the first SR-TX occasion 308.

Assume that the user equipment is not allowed to transmit 312 the SR1 at the first SR-TX occasion 308 because the first MA channel is busy as determined by the LBT carrier sensing mechanism. Additionally, the LBT carrier sensing mechanism determines that the second MA channel is idle, and therefore the user equipment is allowed to transmit 314 the SR2 at the first SR-TX occasion 308. According to conventional systems, a first timer (e.g., sr-ProhibitTimer1) is initiated 316 for the busy channel and a second timer (e.g., sr-ProhibitTimer2) is also initiated 318 for the second channel if the user equipment transmits the scheduling request SR2 on only the idle channel. The sr-ProhibitTimer1 and the sr-ProhibitTimer2 are introduced to reduce load on the physical channels and define a period of time 320, 322 in which the user equipment is not allowed to transmit a scheduling request on a corresponding physical channel. Consequently, before the sr-ProhibitTimer2 expires in this example, the user equipment is not allowed to transmit 324, 326 another scheduling request on the second physical channel at the second SR-TX occasion 328 or the third SR-TX occasion 330. Rather, the user equipment is forced to wait until a next subsequent SR-TX occasion occurring after expiration 332 of the sr-ProhibitTimer2. Similarly, the user equipment is not allowed to transmit another scheduling request on the first physical channel at the second SR-TX occasion 328 or the third SR-TX occasion 330 but is forced to wait until a next subsequent SR-TX occasion occurring after expiration of the sr-ProhibitTimer1. These delays may not be desirable because the user equipment might benefit from transmitting the SR1 at the second or third SR-TX occasions 328, 330, particularly if the data is high priority data, such as voice data or delay-sensitive data.

Using the techniques described herein, certain delays for SR transmissions may be eliminated, allowing the user equipment 102 to transmit data sooner. As described in the above example, the user equipment 102 has been allocated a first PUCCH resource for the first logical channel 302 to transmit a first scheduling request (SR1), and a second PUCCH resource for the second logical channel 304 to transmit a second scheduling request (SR2), both at the first SR-transmission occasion 308. If both logical channels trigger a scheduling request (e.g., both logical channels have a pending scheduling request to transmit), the user equipment 102 first uses a carrier sensing mechanism to check an availability status of each physical channel, according to the LBT rule. In an example, the base station 104 assigns the first logical channel 302 a higher priority level than the second logical channel 304. At the first SR-TX occasion 308, the user equipment 102 determines that the unlicensed MA channel to transmit the SR1 on the first PUCCH resource is busy, but the unlicensed MA channel to transmit the SR2 on the second PUCCH resource is idle. This may occur when the first PUCCH resource and the second PUCCH are located in different serving cells. In that case, the user equipment 102 is typically limited to transmitting 314 the SR2 on the idle resource, e.g., the second PUCCH resource. And the LBT rule prohibits the SR1 transmission 312 at this first SR-TX occasion 308.

In contrast to conventional systems that automatically initiate 316, 318 timers for both logical channels based on the SR2 transmission at the first SR-TX occasion 308, using the techniques described herein, the user equipment 102 may be configured to determine whether to initiate 316 the sr-ProhibitTimer1 for the first logical channel 302 in the above example by first determining a priority level of each of the first and second logical channels 302, 304. If the first logical channel 302 is a low-priority channel, or has a lower priority level than the second logical channel (e.g., based on a comparison of channel-priority assignments of the two logical channels), then the user equipment 102 initiates 316 the first timer (e.g., sr-ProhibitTimer1) for the first logical channel 302 at the same time as initiating 318 the second timer (sr-ProhibitTimer2) for the second logical channel 304.

If, however, the first logical channel 302 has a high-priority level, or has a higher priority level than the second priority channel 304, then the user equipment 102 does not initiate 316 the first timer for the first logical channel 302. Rather, the user equipment 102 is allowed to attempt to transmit 324 the SR1 at the next SR-transmission occasion (second SR-TX occasion 328) without waiting for expiration of a timer. At the next subsequent SR-transmission occasion, such as the second SR-TX occasion 328, the user equipment 102 may again check the availability status of the physical channel corresponding to the first logical channel 302 and if the physical channel is no longer busy (e.g., idle), then the use equipment 102 is allowed to transmit 324 the SR1. Responsive to transmitting 324 the SR1 for the first logical channel 302 at the second SR-TX occasion 328, the user equipment 102 initiates 334 a new timer to prevent the user equipment 102 from retrying the SR transmission again for a period of time 336 defined by the new timer. Accordingly, the user equipment 102 utilizes a priority-level assigned to each logical channel to determine whether to initiate the timer for the busy unlicensed channel.

Example Procedures

Figure 4:
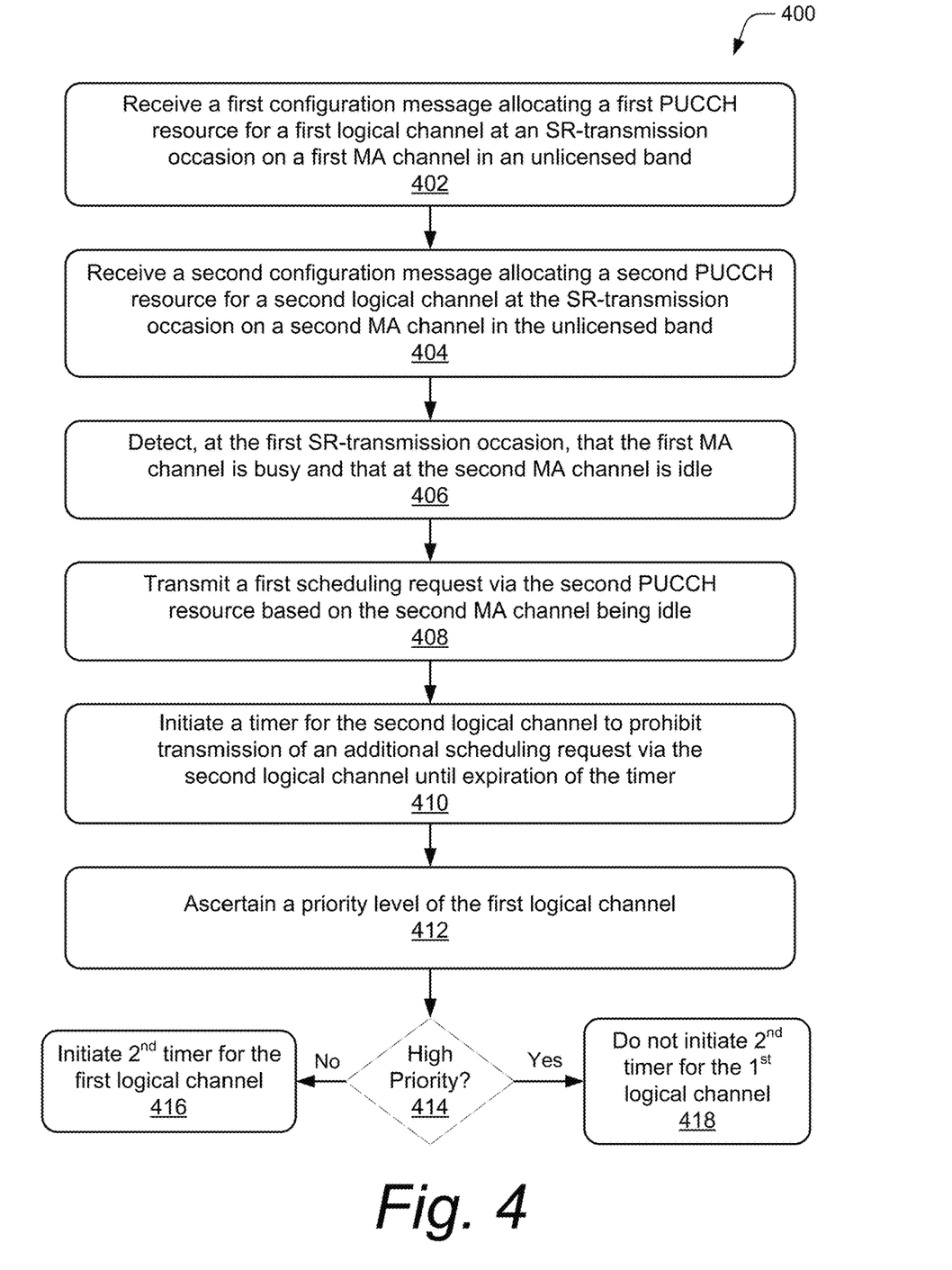
FIG. 4 depicts an example method 400 for managing 5G NR scheduling requests by a user equipment via an unlicensed frequency band in accordance with aspects of the techniques described herein.

Example methods 400 and 500 are described with reference to FIGS. 4 and 5, respectively, in accordance with one or more aspects of managing scheduling requests in an unlicensed frequency band. FIG. 4 depicts an example method 400 for managing scheduling requests by a user equipment via an unlicensed frequency band in accordance with aspects of the techniques described herein.

At 402, a user equipment receives a first configuration message allocating a first physical uplink control channel (PUCCH) resource for a first logical channel on a first multiple-access (MA) channel in the unlicensed frequency band. For example, the user equipment 102 receives the first configuration message from the base station 104 via the wireless link 106 in response to a scheduling request sent by the user equipment 102 requesting to transmit first data, such as device data 214 (e.g., audio data) stored in the CRM 212. The first configuration message may instruct the user equipment 102 to use the first PUCCH resource to transmit the first data when the first PUCCH resource is available.

At 404, the user equipment receives a second configuration message from the base station allocating a second PUCCH resource for a second logical channel. For instance, the user equipment 102 can receive the second configuration message from the same base station 104 or a different serving cell base station in response to another scheduling request sent by the user equipment 102 to transmit second data, such as device data 214 (e.g., video data) stored in the CRM 212. The second configuration message may instruct the user equipment 102 to use the second PUCCH resource to transmit the second data when the second PUCCH resource is available.

At 406, the user equipment detects, at a first SR-transmission occasion, that the first MA channel is busy and the second MA channel is idle. In aspects, an availability status (e.g., busy state, idle state) is determined using any suitable procedure. In one example, the user equipment 102 detects a signal energy of an MA channel relative to a threshold value and for a duration of time. The MA channel may be detected as busy if that channel's signal energy is greater than the threshold value for the duration of time. If not, then that channel may be considered idle (e.g., not busy). The threshold value for each channel may be based on system information included in the corresponding configuration message as defined by the base station. In addition, the duration of time may be predefined by the base station and also included in the corresponding configuration message. In this way, the user equipment 102 can readily check the energy level of a respective MA channel according to that channel's particular characteristics, which may be different for different MA channels.

In some aspects, the user equipment 102 detects that an MA channel is not busy if the user equipment 102 is not performing a backoff procedure for that MA channel, such as by using Carrier Sense Multiple Access/Collision Avoidance (CSMA/CA). If the MA channel was busy during a previous listening period but is now in an idle state, the user equipment 102 may initiate a backoff procedure. There is a contention window (CW), a minimum CW (CWmin), and a maximum CW (CWmax) associated with the unlicensed MA channel. If the user equipment 102 does not transmit the scheduling request due to the channel having a busy state, the contention window is increased (e.g., doubled), and a backoff time is drawn from within the contention window size (CS), e.g., from 0~CS. If the user equipment 102 successfully transmits the scheduling request, the contention window is reset to CWmin.

At 408, the user equipment transmits a scheduling request via the second PUCCH resource based on the second MA channel being idle. Because the second MA channel is idle, it is available for the user equipment to transmit data. Accordingly, the user equipment 102 transmits a scheduling request (e.g., transmit 314 the SR2 at the first SR-TX occasion 308 in FIG. 3) via the corresponding PUCCH resource to notify the base station 104 that data will be transmitted via the corresponding MA channel, e.g., the second MA channel.

At 410, the user equipment 102 initiates a timer (e.g., timer T1 or sr-ProhibitTimer2 discussed in conjunction with FIG. 3) for the second logical channel to prohibit transmission of an additional scheduling request via the second PUCCH resource until expiration of the timer T1. In aspects, the timer T1 is initiated in response to the scheduling request being transmitted via the second PUCCH resource. The timer T1 prevents the user equipment from transmitting another scheduling request during a period of time defined by the timer T1. This reduces processing power, which reduces power consumption and can extend battery life of the user equipment.

At 412, the user equipment ascertains a priority level of the first logical channel. The user equipment can use the priority level to determine whether to initiate another timer (e.g., timer T2 or sr-ProhibitTimer1 discussed in conjunction with FIG. 3) for the first logical channel. In addition, the user equipment 102 also determines the priority level of the second logical channel. These priority levels can be determined relative to one another or relative to some other scale. Alternatively, the priority level may be determined based on an assignment by the base station 104, which may be included in the first configuration message and/or the second configuration message. The priority level may be based on, for example, quality of service requirements for the corresponding logical channel.

At 414, the user equipment determines whether the priority level of the first logical channel is a high priority level. This determination may be based on an absolute or relative comparison of both channel priority metrics. For instance, the priority level of the first logical channel may be compared to the priority level of the second logical channel to determine whether the first logical channel has a higher or lower priority level than the second logical channel. Alternatively, the determination may be based on a channel-priority assignment indicated in the logical channel's corresponding configuration message, such as the first configuration message.

If the second logical channel, which was just used to transmit the scheduling request, has a higher priority level than the first logical channel (or if the first logical channel is assigned a low priority level by the base station 104), then at 416, the user equipment 102 initiates 316 timer T1 for the first logical channel to cause the user equipment to wait until the timer T1 expires to attempt to transmit another scheduling request on the first PUCCH resource. In aspects, the user equipment 102 may wait until expiration of the timer T2 to detect an availability status of the first MA channel in the unlicensed frequency band. In this way, both logical channels now have an sr-ProhibitTimer running.

However, if the priority level of the first logical channel is higher than the priority level of the second logical channel (or if the first logical channel is assigned a high priority level by the base station 104), then at 418, the user equipment 102 does not initiate 316 the timer T2 for the first logical channel. Instead, the user equipment 102 is allowed to utilize the next SR-transmission occasion to attempt to transmit a second scheduling request on the first PUCCH resource on the first MA channel, rather than delaying until expiration of the timer T2. The user equipment 102 may be allowed to check the availability status of the first MA channel, rather than delaying until expiration of the timer T2. This is in contrast to conventional systems, which automatically initiate a timer for both logical channels or a separate timer for each logical channel when one is used to successfully transmit the scheduling request for data transmission.

In aspects, the first logical channel is grouped with a third logical channel to define a logical channel group. The timer T2 may be associated with the logical channel group. In at least one example, the user equipment 102 may transmit another scheduling request for the third logical channel and initiate the timer T2 to prohibit the user equipment 102 from transmitting additional scheduling requests for any channel within the logical channel group. Similarly, the second logical channel may be grouped with a fourth logical channel to define another logical channel group and the timer T1 may be associated with that second logical channel group. By transmitting the scheduling request for the second logical channel, the timer T1 may be applied to all channels within that logical channel group, including the fourth logical channel.

In another aspect, if the user equipment 102 initiates a timer when a logical channel triggers the SR, and does not transmit the SR for that logical channel after the timer expires (e.g., the user equipment 102 has reached a maximum allowed number of attempted SR transmissions), then the user equipment 102 may begin to change serving cells. For example, the user equipment 102 may select a neighbor cell and establish a radio resource control (RRC) connection with that neighbor cell for data transmission. After a connection is established with the neighbor cell, the user equipment 102 may request allocation of new radio resources from the neighbor cell for transmission of the data for the logical channel.

Figure 5:
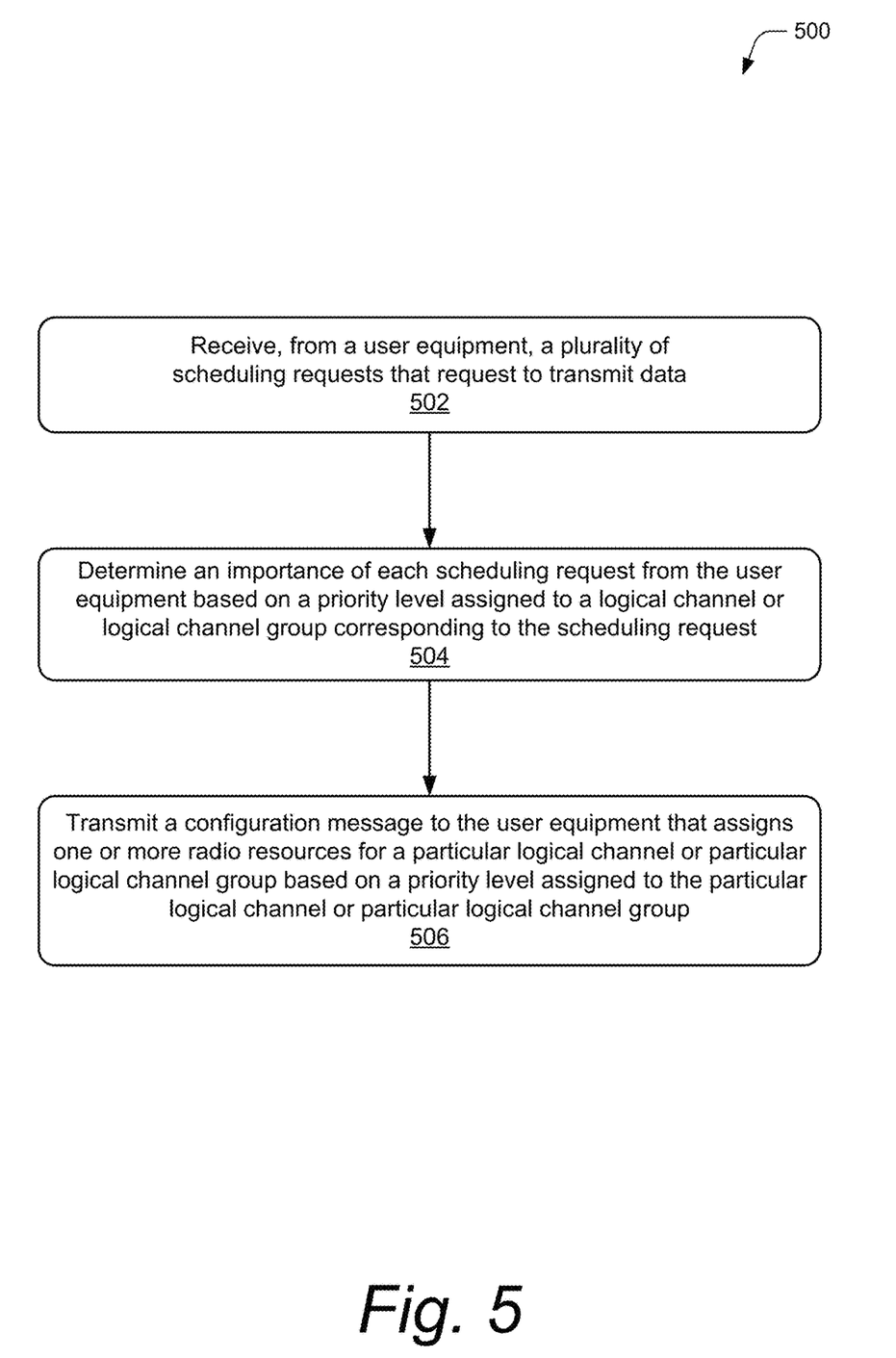
FIG. 5 depicts an example method 500 for managing scheduling requests in an unlicensed frequency band of a fifth generation new radio (5G NR) network by a base station in accordance with aspects of the techniques described herein.

FIG. 5 depicts an example method 500 for managing scheduling requests in an unlicensed frequency band of a wireless network by a base station in accordance with aspects of the techniques described herein.

At 502, the base station receives, from a user equipment, a plurality of scheduling requests that request to transmit data. In aspects, the scheduling requests may be received via an uplink RRC message, a MAC control element (CE), a Scheduled UpLink (SUL), or an LTE uplink.

At 504, the base station determines an importance of each scheduling request from the user equipment based on a priority level assigned to a logical channel or logical channel group corresponding to the scheduling request. The base station 104 assigns each logical channel or logical channel group a priority level based on any suitable factor, such as quality of service requirements. In some aspects, the base station 104 can determine the importance of scheduling requests from different user equipment devices based on the logical channels or the logical channel groups that request to transmit data. Based on this determination, the base station 104 can allocate radio resources to the user equipment 102 with a logical channel or logical channel group that has a higher priority level, is more important or urgent, or has low delay requirements. Similarly, the base station 104 can allocate resources to the user equipment 102 with a logical channel or logical channel group that has a lower priority level.

At 506, the base station transmits a configuration message to the user equipment that allocates one or more radio resources for a particular logical channel or particular logical channel group based on a priority level assigned to the particular logical channel or particular logical channel group. For example, the base station 104 generates and transmits a configuration message to the user equipment 102 via the wireless link 106 to allocate the radio resources for a particular logical channel. The base station 104 may assign the user equipment 102 a first PUCCH resource for the first logical channel or for a first logical channel group including the first logical channel. In this way, a scheduling request received on the first PUCCH resource inherently or automatically indicates to the base station 104 that the first logical channel or the first logical channel group is requesting to transmit data.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-particular Integrated Circuits (ASICs), Application-particular Standard Products (ASSPs), System-on-a-chip systems (SoCs), Complex Programmable Logic Devices (CPLDs), and the like.

Although aspects of managing scheduling requests in an unlicensed frequency band have been described in language particular to features and/or methods, the subject of the appended claims is not necessarily limited to the particular features or methods described. Rather, the particular features and methods are disclosed as example implementations of managing scheduling requests in an unlicensed frequency band, and other equivalent features and methods are intended to be within the scope of the appended claims, such as managing scheduling requests on multiple-access channels with LBT rules (e.g., licensed channels). Further, various different aspects are described, and it is to be appreciated that each described aspect can be implemented independently or in connection with one or more other described aspects.

The order in which the method blocks of FIGS. 4-5 are described are not intended to be construed as a limitation, and any number of the described method blocks can be combined in any order to implement a method, or an alternate method.

When an ordinal number (such as "first", "second", "third" and so on) is used as an adjective before "configuration message", "PUCCH", "logical channel", "physical channel", or "MA channel", that ordinal number is used to indicate a particular feature, such as to distinguish that particular feature from another feature that is described by the same term or by a similar term. For example, a "first widget" may be so named merely to distinguish it from, e.g., a "second widget".

What is claimed is:

1. A method for managing scheduling requests by a user equipment over an unlicensed frequency band, the method comprising:
  receiving, by the user equipment, a first configuration message allocating a first uplink control channel resource for a first logical channel on a first multiple-access channel in the unlicensed frequency band;
  receiving, by the user equipment, a second configuration message allocating a second uplink control channel resource for a second logical channel on a second multiple-access channel in the unlicensed frequency band;
  detecting, at a scheduling request-transmission occasion, that the first multiple-access channel is busy and the second multiple-access channel is idle;
  transmitting a first scheduling request via the second uplink control channel resource based on the second multiple-access channel being idle;
  initiating a second timer for the second logical channel to prohibit transmission of an additional scheduling request via the second logical channel before expiration of the second timer;
  ascertaining a first priority level of the first logical channel; and
  based on the first priority level, enabling transmission of a second scheduling request via the first uplink control channel resource at a future scheduling request-transmission occasion by not applying a first timer for the first logical channel.

2. The method of claim 1, wherein the future scheduling request-transmission occasion occurs prior to expiration of the second timer for the second logical channel.

3. The method of claim 1, wherein enabling transmission of the second scheduling request comprises:
  ascertaining a second priority level of the second logical channel;
  discerning that the first priority level is higher than the second priority level; and
  enabling the user equipment to detect a status of the first multiple-access channel in the unlicensed frequency band at the future scheduling request-transmission occasion.

4. The method of claim 3, wherein the ascertaining the second priority level comprises:
  identifying the second uplink control channel resource is being used for transmitting data that is not sensitive to delay.

5. The method of claim 1, wherein ascertaining the first or second priority level comprises:
  receiving a channel-priority assignment indicated in one or more of the first configuration message and the second configuration message.

6. The method of claim 1, wherein the ascertaining the first priority level comprises:
  identifying that the first uplink control channel resource is being used for transmitting delay-sensitive data.

7. The method of claim 1, wherein:
  detecting that the first multiple-access channel is busy comprises detecting that a first signal energy on the first multiple-access channel is above a first threshold value for a first predefined duration of time; and
  detecting that the second multiple-access channel is idle comprises detecting that a second signal energy on the second multiple-access channel is below a second threshold value for a second predefined duration of time.

8. The method of claim 7, further comprising:
  determining the first threshold value based on system information received in the first configuration message; and
  determining the second threshold value based on additional system information received in the second configuration message.

9. The method of claim 1, further comprising:
  transmitting the second scheduling request via the first uplink control channel resource at the future scheduling request-transmission occasion; and
  initiating the first timer for the first logical channel responsive to transmitting the second scheduling request.

10. A method for managing scheduling requests in an unlicensed frequency band of a wireless network by a base station, the method comprising:
  transmitting a first configuration message to a user equipment that allocates a first uplink control channel resource for a first logical channel or a first logical channel group on a first multiple-access channel in the unlicensed frequency band, the first logical channel or first logical channel group being associated with a first priority level;
  transmitting a second configuration message to the user equipment that allocates a second uplink control channel resource for a second logical channel or a second logical channel group on a second multiple-access channel in the unlicensed frequency band, the second logical channel or second logical channel group being associated with a second priority level;
  receiving, from the user equipment, a first scheduling request via the second uplink control channel resource; and
  receiving, from the user equipment, a second scheduling request via the first uplink control channel resource at a future scheduling request-transmission occasion, the future scheduling request-transmission occasion occurring before expiry of a timer at the user equipment for the second logical channel.

11. The method of claim 10, further comprising assigning the first priority level to the first logical channel or the first logical channel group and the second priority level to the second logical channel or the second logical channel group.

12. The method of claim 10, further comprising assigning a first uplink control channel resource for the first logical channel or the first logical channel group that includes the first logical channel based on a first scheduling request.

13. The method of claim 10, further comprising transmitting the assignment of the first uplink control channel resource to the user equipment over a first multiple-access channel in the unlicensed frequency band of the wireless network.

14. The method of claim 10, further comprising:
assigning a second uplink control channel resource for the second logical channel or the second logical channel group based on a second scheduling request; and
transmitting the assignment of the second uplink control channel resource to the user equipment over a second multiple-access channel in the unlicensed frequency band of the wireless network.

15. A mobile communication device comprising:
a radio frequency transceiver; and
a processor and memory system to implement a scheduling request-manager application for managing scheduling requests in an unlicensed frequency band and configured to:
receive a first configuration message allocating a first uplink control channel resource for a first logical channel on a first multiple-access channel in the unlicensed frequency band;
receive a second configuration message allocating a second uplink control channel resource for a second logical channel on a second multiple-access channel in the unlicensed frequency band;
determine, for a scheduling request-transmission occasion, that the first multiple-access channel is busy and the second multiple-access channel is idle, and in response to the determination:
transmit a scheduling request via the second uplink control channel resource;
initiate a second timer for the second logical channel, the second timer defining a duration of time in which the mobile communication device is prohibited from transmitting one or more additional scheduling requests via the second uplink control channel resource;
ascertain a first priority level of the first logical channel; and
based on the first priority level, enable the scheduling request-manager application to transmit a second scheduling request via the first uplink control channel resource at a future scheduling request-transmission occasion by not applying a first timer for the first logical channel.

16. The mobile communication device of claim 15, wherein the future scheduling request-transmission occasion occurs prior to expiration of the second timer for the second logical channel.

17. The mobile communication device of claim 15, wherein the scheduling request-manager application is further configured to:
ascertain a second priority level of the second logical channel;
determine that the first priority level is higher than the second priority level; and
in response to the determination that the first priority level is higher than the second priority level, allow the mobile communication device to detect the availability status of the first multiple-access channel at the future scheduling request-transmission occasion.

18. The mobile communication device of claim 15, wherein the scheduling request-manager application is configured to ascertain the first priority level based on a channel-priority assignment indicated in the first configuration message.

19. The mobile communication device of claim 15, wherein:
the first configuration message includes the first priority level assigned to the first uplink control channel resource;
the second configuration message includes a second priority level assigned to the second uplink control channel resource; and
the scheduling request-manager application is configured to determine that the first priority level is a high priority level when the first priority level is higher than the second priority level.

20. The mobile communication device of claim 15, wherein the scheduling request-manager application is further configured to:
transmit the second scheduling request via the first uplink control channel resource at the future scheduling request-transmission occasion; and
apply the first timer for the first logical channel in response to the second scheduling request being transmitted via the first uplink control channel resource.

* * * * *